Oct. 12, 1948.   J. E. WESCOTT   2,451,265
AIRCRAFT LANDING GEAR LOCK
Filed July 17, 1945   2 Sheets-Sheet 1
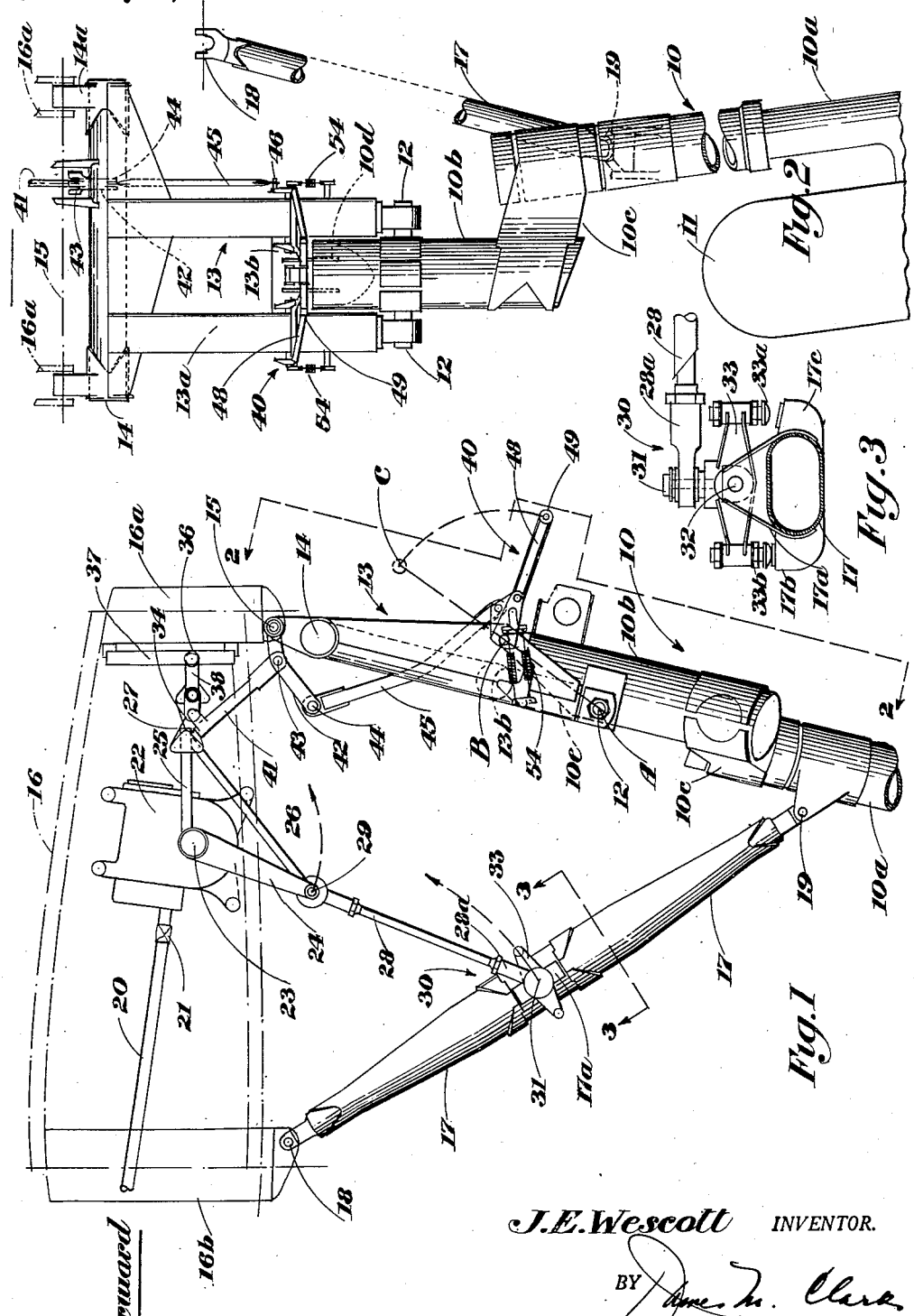
J. E. Wescott  INVENTOR.
BY
His Patent Attorney Oct. 12, 1948.　　　　J. E. WESCOTT　　　　2,451,265
AIRCRAFT LANDING GEAR LOCK Filed July 17, 1945　　　　　　　　　　　　　2 Sheets-Sheet 2

J. E. Wescott INVENTOR.

BY James M. Clark
His Patent Attorney

Patented Oct. 12, 1948

2,451,265

UNITED STATES PATENT OFFICE 2,451,265

AIRCRAFT LANDING GEAR LOCK

John E. Wescott, Hagerstown, Md., assignor to Fairchild Engine and Airplane Corporation, a corporation of Maryland Application July 17, 1945, Serial No. 605,523

9 Claims. (Cl. 244—102)

The present invention relates generally to landing gears for aircraft and similar vehicles, and more particularly to improvements in mechanism for locking and securing the pivoted joints of such landing gears in their operative positions.

In the design of modern high performance airplanes of the land type, retractable landing gears are almost universally provided to withdraw the wheels into the aircraft body or wing to reduce their resistance in flight, and in such landing gears, it frequently becomes expedient to utilize struts of the so-called "breaking" type. A strut which is pivoted or articulated between its terminals to facilitate its being folded with respect to its parts, in addition to the swinging pivotation about its upper terminal, has generally become known in the art as a "breaking" strut. In such "breaking" strut landing gears, it is of utmost importance that the strut which "breaks" in retraction is securely locked against inadvertent collapsing or folding in its extended operative position, particularly when subjected to shocks and impacts incidental to landing or running over rough terrain.

A further consideration of importance is the necessity that the locking means for such struts be so timed in its operation that it permits the "breaking" strut to become fully extended and aligned before the lock is applied, and also to unlock the strut immediately before the retractive force is applied to the landing gear. Heretofore, many efforts have been made to lock landing gears, and particularly the "breaking" struts thereof, but those devices which have been used most commonly were generally of the latch or axially movable pin type, frequently requiring spring actuation and usually of cumbersome construction. Most of these prior devices have been susceptible of being obstructed and impaired by operation on muddy or otherwise unsurfaced landing fields, and have frequently been placed out of adjustment and have otherwise failed to operate satisfactorily under continental service conditions.

The present invention is directed to an improved type mechanism comprising essentially three sets of hinged links of equal length separately articulated to the "breaking" strut retracting mechanism and a lost-motion device to provide proper timing of the lock. The present invention also embodies an improved yoke type construction for attaching the upper terminal of the "breaking" strut to the aircraft structure, the provision of an improved retracting mechanism and lock actuating device as well as a quick make-and-break double acting spring device to snap the locking linkage into and out of its locking condition across the dead-centers of the locking pivots.

It is accordingly a major object of the present invention to provide an improved lock for a retractable landing gear. A further object resides in the provision of a simplified fool-proof locking mechanism which does not require the use of reciprocating latches or axially movable pins. A further object of this invention resides in the provision of a "breaking" strut lock which is made operative or inoperative concurrently with the retraction of the landing gear assembly and accomplishes such locking function automatically by the pivotation of the several links of which it is comprised. A further object lies in the provision of a novel lost-motion device to insure positive locking and unlocking properly timed with respect to extension and retraction of the gear. This invention also has for one of its objects the provision of a novel and advantageous retractable landing gear arrangement, including the actuating and lock initiating mechanisms, both with respect to its general organization and the details of its several parts.

Other objects and advantages of the present invention will become apparent to those skilled in the art after reading the present specification as taken into consideration with the accompanying drawings forming a part hereof, in which:

Fig. 1 is a side elevational view of a preferred form of the present invention as applied to a retractable landing gear attached to the wing of an airplane;

Fig. 2 is an elevational view of the landing gear assembly as taken along the lines 2—2 of Fig. 1 looking forward;

Fig. 3 is an enlarged detail view of a lost-motion device associated with a fixed strut of the landing gear;

Figure 4:
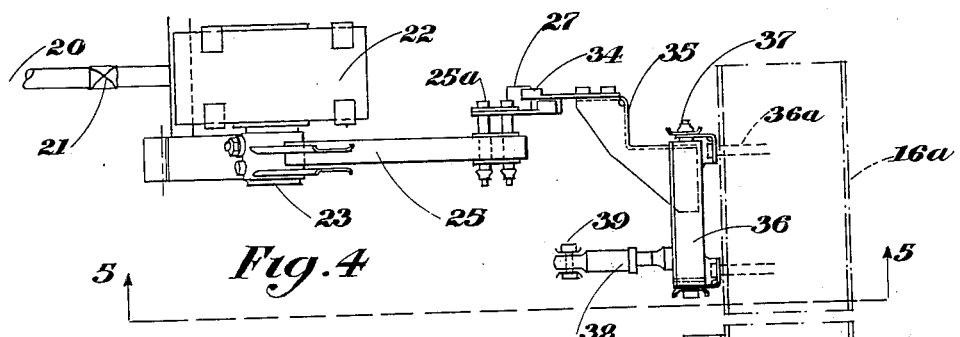
Fig. 4 is a plan view of a portion of the retracting mechanism and the lock actuating device.

Referring now to Figs. 1 and 2, the numeral 10 indicates the main shock absorbing strut of a landing gear and comprises a lower shock-absorber wheel-carrying portion 10a to which is rotatably mounted the ground-engaging wheel 11, the upper part of the portion 10a being rigidly attached, as by the fitting 10b, to the upper tongue portion 10c. The latter portion 10d is pivotally mounted or articulated by means of the transverse horizontal pin 12 upon the arms or bifurcations 13a of a yoke member 13, this yoke and the strut 10, hinged by the pin 12, comprising the "breaking" strut and joint of the type heretofore referred to.

The arms 13a of the yoke 13 are intermediately interconnected by a tubular tie 13b of integral construction and embrace the upper end of the strut portion 10b which terminates in an angularly cut portion 10e to which are integrally attached or welded the plates 10d, to be hereinafter more fully described. The upper portion of the arms 13a of the yoke are connected by the cross tubular assembly 14 carrying integral lugs 14a apertured to receive the hinge pins 15 by which the yoke is pivotally attached to the rear spar 16a of the wing 16.

A rigid inclined drag strut 17 of fixed length is pivotally connected to the front wing spar 16b by the pivot pin 18 at its upper forward end and is pivotally connected by the pin 19 at its lower rearward end through a fitting integral with the lower wheel-carrying portion 10a of the strut 10. The landing gear arrangement shown in Fig. 1, as selected for explanatory purposes, is retracted upon counterclockwise rotation of the drag strut 17 about its pivot 18, serving to rearwardly break the main strut 10 and its yoke member 13 at its articulated joint 12, such that the landing wheel is drawn upwardly in a substantially vertical direction.

As indicated in Fig. 1 the mechanism for retracting the landing gear is comprised of a torque shaft 20, preferably coupled to a suitable motor or other source of rotary power (not shown), the shaft being universally coupled at 21 to a gearbox 22 provided with a horizontally extending low speed shaft 23. It includes a triangular driving frame 24—25—26 which is suitably keyed or fastened to the shaft 23, and comprises a rigid frame consisting of a strut-retracting crank 24 and the lock-actuating crank 25, each fixedly attached to each other and the shaft 23 at their inner intersecting ends and tied together at their outer ends by the member 26. The lower outer terminals of 24 and 26 are provided with a pivot 29 to which is articulated the actuating link 28, the lower terminal clevis 28a of which is pivotally attached to a lost-motion device 30, which is shown in detail in Fig. 3.

Referring now to the latter figure, bracket portions 17a are welded or otherwise attached to the central portion of the drag strut 17 and provide journals for the pivot 32 which is offset from, but extends parallel to, the inclined longitudinal axis of the drag strut. A rocker element 33 provided with adjustable contacts 33a and 33b at each end is pivotally mounted for rocking movements upon the pivot 32 and has an upstanding portion in engagement with a further pivot 31, normal to the axis of pivot 32, and to which the clevis terminal 28a is pivotally connected by means of a universal fitting. The drag strut 17 is further provided with laterally extending detent portions 17b and 17c adapted to be engaged by the aforementioned adjustable contacts or stops 33b and 33a for limiting the movement or throw of the rocker 33 and thereby establishing the degree of lost-motion through which the actuating rod 28 may move before it applies its force directly to the drag strut.

Figure 5:
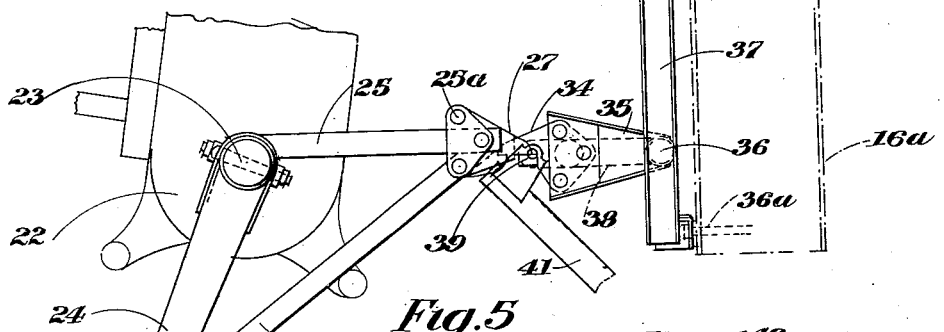
Fig. 5 is a side elevational view of the mechanism and device shown in Fig. 4, as taken along the lines 5—5 thereof.

The lock actuating mechanism is rotated simultaneously with the retracting strut mechanism and from the same gearbox 22 by means of a cam 27 which is rigidly supported at the intersection of the crank 25 and the cross frame member 26. A complementary cam element 34 is fixedly attached to a lever bracket 35 in turn mounted upon the pivot assembly 36 attached to the rear spar 16a by means of the bolts 36a. The cam 34 is such that it is engageable by the cam 27 in both further clockwise movement of the arm 25 from the position shown in Figs. 1 and 5, or as well as any counterclockwise movement from this position. To an adjacent portion of the pivotal assembly 36, pivotally mounted upon the brackets 37, there is fixedly attached an arm 38 pivotally connected by the pin 39 to the link 41 of the down lock assembly 40.

The link 41 is pivotally connected to a lever 42 by means of the pivotal connection 43; the lever 42 being pivotally mounted upon the above mentioned pivot 15 of the landing gear yoke and provided at its outer extremities with a pivotal connection 44 to a further link 45 of irregular conformation to clear the cross tie 14 of the yoke as the "breaking" strut is folded upwardly upon itself. The lower end of the curved link 45 is pivotally connected by the pin 46 to an arm 47b of the link 47 which is intermediately braced by the cross tie element 47a as more particularly shown in detail in Fig. 7. A similar link 48 is provided on the opposite side of the extended axis of the strut 10, being similarly provided with an arm portion 48b and a brace tie 48a. The triangular framework of the links 47 and 48 terminate in apices at their outer extremities on which they are provided with fittings embracing the common pivot pin 49 to which is also pivotally connected an intermediate central link or arm 50 of the same length as links 47 and 48.

These outside triangular links 47 and 48 are pivotally mounted as by the pins 51 and 52 respectively to the gusset plates 13a of the upright yoke elements. The central link 50, connected at its outer terminal to the common pin 49, is pivotally connected at its inner terminal to the aforementioned gusset plates 10d fixedly attached to the upper terminal of the strut portion 10b. Referring to both Figs. 6 and 7 which show in full line the locked position of the "breaking" strut, it will be noted that in this locked position the axes of the pivot pins 51, 52 and 53 are transversely aligned along a common axis which has been designated in Fig. 6 as axis B which together with the parallel axis 12, being the axis of articulation of the "breaking" strut, serves to define the straight line A—B—C into which the links 47, 48 and 50 may be rotated in a counterclockwise direction in such manner that the pivot 49 is rotated to the point C at which the strut 10 is capable of being folded or rotated in a clockwise direction about the pivot 12, and the yoke 13 folded in the opposite direction.

Figures 6, 7:
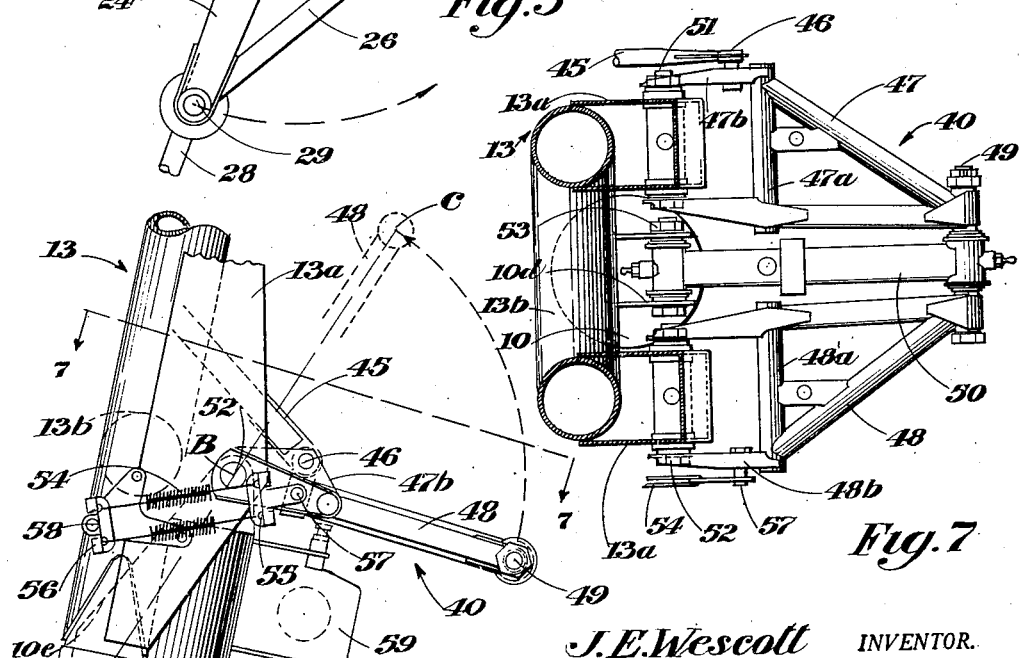
Fig. 6 is an enlarged detail view of the articulated portion of the "breaking" strut and its associated locking mechanism.
Fig. 7 is a sectional view looking downwardly upon the articulated strut and locking mechanism of Fig. 6 as taken along the lines 7—7 thereof.

Further referring to Figs. 6 and 7, there is pivotally connected to the outer arms 47b and 48b, as by the pivot 57, a double tension spring 54 having terminal fittings 55 and 56 pivotally mounted respectively at 57 on the swinging linkages 47 and 48, and at the pivot 58 upon the yoke member 13. The spring unit 54 serves as a quick-acting resilient element to snap the links 47 and 48 into their locking position as the pivots 58, 52 and 57 proceed beyond the dead-center position after the gear has been fully extended and during the succeeding locking cycle. A further important purpose of the springs 54 is to hold the locking links in an unlocked position in case there is a time lag between the disengagement of the cams 27 and 34 and the start of the retraction of the landing gear due to the rocker 33 not having as yet engaged the stop 17c at the same instant that the cam becomes disengaged. In other words, the quick-acting spring mechanism serves to maintain the landing gear locking mechanism from dropping into its locking or binding condition as soon as the cam 34 may have disengaged but prior to the application of a positive reacting force by the actuating link 28 upon the drag strut 17 initiating folding of the "breaking" strut. The further application of the retracting force to the drag strut will continue to "break" or fold the main strut about its pivot axis 12 and to move the axis of the pin 53 downwardly out of alignment with the line A—B—C.

It will accordingly be noted that clockwise rotation of the low speed shaft 23 of the actuating gearbox 22 causes extension of the landing gear from its retracted position by permitting the gear to drop by gravity, and during this down cycle the rocker 33 remains in the same position as during the upward or retracting cycle referred to above in which the stops 33a and 17c are in contact, being held statically in this relationship due to the weight of the landing gear pulling against the actuating mechanism, and due also to the retarding or braking action of the gearbox 22. It will also be apparent that the landing gear cannot be locked until it has reached the fully extended or down position. This is automatically taken care of by the lost-motion rocker 33 which insures that the landing gear be at its extreme down position before the links swing into their locked position. It is similarly apparent that the landing gear cannot be retracted before it is unlocked and the rocker assembly 33 also insures that the retracting driving frame 24—25—26 is rotated slightly in a counterclockwise direction to initiate unlocking of the linkages 47, 48 and 50 during the period in which the rocker 33 in Fig. 3 rotates from the position shown in which 33b and 17b are in contact, to the position in which 33a and 17c would be in contact, and the lifting force is applied directly from the actuating link 28 to the drag strut 17. The lost-motion assembly 33 also provides an additional distinct advantage in that it permits both the landing gear retracting mechanism and the locking mechanism to be actuated from the same gearbox and the same power source.

As indicated above, clockwise rotation of the gearbox shaft 23 and the frame 24—25—26 causes extension of the landing gear from its retracted position during which period the weight of the gear pulls against the lagging or braking gearbox and the rocker is in the opposite position to that shown in Fig. 3. During the latter portion of this extending or "down" cycle of the driving mechanism the cam 27 engages the cam 34 and the locking linkage is gradually rotated from its dotted position C in Fig. 1 toward the full line position of this figure. Immediately after the landing gear reaches the down extremity the simultaneous engagement of the cam serves to drive the links beyond the previously referred to dead-center position of the pivots 58, 52 and 57 beyond which the quick-acting spring 54 snaps the links into the "locked" position and the rocker 33 is permitted to rotate freely in a direction which disengages the rocker portion 33a from the stop 17c and rocks it into the position shown in Fig. 3 in which the mechanism is left in a condition to again start upon the following "up" cycle. As indicated in Figs. 1 and 6, a limit switch 59 of the micro-switch type is fixedly attached to the upper portion of the main strut part 10b with its movable element in a position where it is contacted by the linkage 48 such that use may be made, in a well known manner, of the making or breaking of the electrical contact to stop the source of power at the end of the "down" cycle, to provide a suitable signal or indicator for the operator that the gear is in the locked position, or to initiate or actuate a signal.

The present specification and drawings have been directed to a single preferred embodiment of this invention for purposes of simplifying its description and explanation, but it is contemplated that the essential features of the present invention are adapted for use in other landing gear arrangements and in other than aircraft landing gears. Such other forms and modifications of the present invention as may occur to those skilled in the art after reading the present specification and drawings are intended to fall within the scope and spirit of this invention as more specifically set forth in the appended claims.

I claim:

1. In an articulated joint, the combination of pivotally connected joint members, one of said members extending to a terminal longitudinally displaced from said pivotal connection, a locking device comprising pivotally connected links each pivotally mounted respectively on one of said joint members on the same transverse axis in the region of said extended member terminal in the aligned position of said joint members, and means for moving said links to displace the axis of their pivotal interconnection from the plane defined by the axis of their pivotal connection to said respective joint members and the axis of pivotal interconnection of said joint members for the locking of the said articulated joint and for placing the axis of the pivotal interconnection of said links in the same said plane but remote from the axis of pivotal interconnection of said joint members for the unlocking of said members.

2. In a "breaking" strut, the combination of a pair of pivotally connected strut halves, said strut halves overlapping beyond the transverse plane of said pivotal connection, a locking mechanism comprising at least two pivotally connected links each pivotally mounted respectively on one of said strut halves in the region of their overlapping portions at one terminal of each link and pivotally connected to each other at their opposite terminals, the said pivotal connection of said links to said strut halves being axially aligned and parallel to the strut pivot and the pivot of said first link terminals and means for rotating said links about the axes of their pivotal connections to said strut halves until said axes and those of the said pivotal interconnection of said link terminals and of said strut halves lie in the same plane in a parallel relationship but not in axial alignment therein to permit unlocking movement of said strut halves.

3. In an aircraft landing gear strut, the combination of pivotally connected strut members adapted when aligned to assist in the support of said aircraft, one of said strut members extending to a terminal longitudinally displaced from said pivotal connection to the other said strut member, a locking device comprising pivotally connected links of equal length each pivotally mounted respectively on one of said strut members on the same transverse axis in the region of said extended strut member terminal with their pivotal axes in alignment when the said strut members are aligned, and means for moving the said links to displace the axis of their pivotal interconnection thereof from the plane defined by the axis of pivotal interconnection of the said strut members and the pivotal connection of the remaining link terminals thereto for the locking of the strut members, and for placing the axis of their pivotal interconnection in the same said plane but remote from the axis of pivotal interconnection of said strut members for the unlocking of said strut members.

4. In an aircraft strut, a wheel-carrying strut portion, a yoke strut portion pivotally mounted upon a supporting aircraft structure at its upper terminal and pivotally embracing the said wheel-carrying strut portion adjacent the lower terminal of said yoke strut portion, the upper terminal of said wheel-carrying strut portion extending upwardly beyond the said pivotal connection to said yoke strut portion, a pair of laterally spaced links of equal length each pivotally interconnected at their outer terminals extending laterally from said strut upon a common pivotal axis and separately pivotally connected to said yoke strut portion at their inner terminals in the region of the upper terminal of said wheel-carrying strut portion, a link member pivotally interconnected with said common outer pivot intermediate said first links and pivotally connected to an upper terminal of said wheel-carrying strut portion in alignment with said pivot axes of said strut when said yoke and wheel-carrying strut portions are in operative alignment, and means associated with one of said laterally spaced links to rotate all three such links into positions laterally of said strut for locking and unlocking said aircraft strut portions.

5. In a retractable landing gear for aircraft, a main strut of the breaking type comprising a lower wheel-carrying portion and an upper yoke portion pivotally articulated thereto, said yoke portion being pivotally connected to the aircraft structure at its upper terminal, a drag strut pivotally connected to the aircraft structure on an axis spaced from said yoke pivot connection to the aircraft structure and pivotally connected at its opposite terminal to said wheel-carrying strut portion, a plurality of links pivotally interconnected to each other and separately to said breaking strut portions on aligned axes in the aligned condition of said strut portions adapted for the locking of said strut portions in the aligned extended position of said breaking strut by preventing their said pivotal articulation, and actuating means operatively connected to both said drag strut and said locking means for the extension of said drag strut and said main strut portions into their aligned positions and the locking of said breaking strut portions.

6. In a retractable landing gear for aircraft, a main strut of the breaking type comprising a lower wheel-carrying portion and an upper yoke portion pivotally articulated thereto, said yoke portion being pivotally connected to the aircraft structure at its upper terminal, a drag strut pivotally connected to the aircraft structure on an axis spaced from said yoke pivot connection to the aircraft structure and pivotally connected at its opposite terminal to said wheel-carrying portion, a plurality of links pivotally interconnected to each other and separately to said breaking strut portions on aligned axes in the aligned condition of said strut portions adapted for the locking of said strut portions in the aligned extended position of said breaking strut by preventing the said pivotal articulation of its said strut portions, lost-motion means interposed between said locking means and said drag strut, and actuating means operatively connected to both said drag strut through said lost-motion means and to said locking means for the initial extension of said landing gear and the subsequent locking of said breaking strut portions.

7. In a retractable aircraft landing gear including a breaking leg strut pivotally connected at its upper terminal to the aircraft structure and rotatably carrying a ground engaging wheel at its lower terminal, a drag strut pivotally connected to said aircraft structure and to said breaking strut at its lower portion, a plurality of locking links of equal length pivotally interconnected to each other at adjacent terminals of each and respectively to each portion of said breaking strut on aligned axes in the operative condition of said breaking strut, said locking links adapted when disposed such that all of their axes are parallel but not coincidental to permit unlocking of said breaking strut portions, and common power means for the rotation of said locking links about the axes of their pivotal connections to said breaking strut portions to cause initial unlocking of said breaking strut and subsequent retraction of said landing gear.

8. A retractable landing gear for aircraft comprising a breaking strut including an upper yoke portion pivotally attached to the aircraft and a lower wheel-carrying strut portion pivotally articulated to said yoke portion, dual links locking means pivotally interconnected at adjacent ends and pivotally connected respectively to the said yoke and wheel-carrying strut portions at the opposite end of each, a drag strut pivotally interconnected between said aircraft structure and said wheel-carrying strut portion, mechanism connected to said locking device adapted for its rotation about its pivotal connection to said struts in their operative position into locking and unlocking conditions of said breaking strut, a lost-motion device associated with said drag strut, actuating linkage connected to said lost-motion device, rotary power means adapted for concurrent engagement with said actuating linkage and said lock actuating mechanism whereby rotation of said power means initially unlocks said breaking strut prior to said actuating links overcoming said lost-motion device and applying retractive force to said drag strut.

9. A retractable landing gear for aircraft comprising a breaking strut including an upper yoke portion pivotally attached to the aircraft and a lower wheel-carrying strut portion articulated thereto, locking means including plural links pivotally interconnected at adjacent ends and pivotally connected at their other ends respectively to the said yoke and wheel-carrying strut portions, said locking means rotatable in the operative position of said strut portions from a locked to an unlocked position across an intermediate dead-center position, a drag strut pivotally interconnected to said aircraft structure and to said wheel-carrying strut portion, lock actuating mechanism connected to said locking means adapted for its rotation into locked and unlocked conditions of said breaking strut, a quick acting tension device pivotally interconnected to said locking means and said strut yoke portion for holding said locking means in either position beyond its dead-center position, lost-motion mechanism associated with said drag strut, retraction actuating linkage connected to said lost-motion mechanism, rotary power means adapted for concurrent engagement with said actuating linkage and said lock actuating mechanism whereby rotation of said power source initially unlocks said breaking strut prior to said actuating links overcoming the lost-motion in said lost-motion device and applying retractive force to said drag strut.

JOHN E. WESCOTT.

REFERENCES CITED

The following references are of record in the file of this patent:

UNITED STATES PATENTS

| Number | Name | Date |
| --- | --- | --- |
| 2,359,554 | Griswold | Oct. 3, 1944 |
| 2,374,146 | Waters | Apr. 17, 1945 |